(12) United States Patent
Ondruska et al.

(10) Patent No.: US 11,503,428 B2
(45) Date of Patent: *Nov. 15, 2022

(54) SYSTEMS AND METHODS FOR CO-LOCALIZATION OF MULTIPLE DEVICES

(71) Applicant: BLUE VISION LABS UK LIMITED, London (GB)

(72) Inventors: Peter Ondruska, London (GB); Lukas Platinsky, Oxfordshire (GB)

(73) Assignee: Blue Vision Labs UK Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/062,268

(22) Filed: Oct. 2, 2020

(65) Prior Publication Data

US 2021/0144513 A1    May 13, 2021

Related U.S. Application Data

(63) Continuation of application No. 16/598,973, filed on Oct. 10, 2019, now Pat. No. 10,798,526, which is a
(Continued)

(30) Foreign Application Priority Data

Oct. 4, 2017 (GB) ........................ 1705767
Mar. 5, 2018 (GB) ........................ 1804192

(51) Int. Cl.
*H04W 4/02* (2018.01)
*G06T 7/73* (2017.01)
(Continued)

(52) U.S. Cl.
CPC ........... *H04W 4/023* (2013.01); *G06T 7/75* (2017.01); *G06T 19/006* (2013.01); *G06V 20/10* (2022.01);
(Continued)

(58) Field of Classification Search
CPC .... G01S 5/0027; G01S 5/0284; G01S 5/0054; G01S 13/04; G01S 5/0289; G01S 5/0294;
(Continued)

(56) References Cited

U.S. PATENT DOCUMENTS 8,538,442 B1 * 9/2013 Ettinger et al. ............... 455/446
8,909,251 B2   12/2014 Agarwal et al.
(Continued)

FOREIGN PATENT DOCUMENTS

GB    2441854        3/2008
WO    2016003526 A2  1/2016
WO    2016064604     4/2016

OTHER PUBLICATIONS

Castro et al., "Multi-robot SLAM on Client-Server Architecture", 2012 Brazilian Robotics Symposium and Latin American Robotics Symposium, pp. 196-201.
(Continued)

*Primary Examiner* — Meless N Zewdu
(74) *Attorney, Agent, or Firm* — Sheppard Mullin Richter & Hampton LLP (57) ABSTRACT

Systems, methods, and non-transitory computer-readable medium can receive a plurality of localization requests from a plurality of devices, each of the plurality of localization requests comprising sensor data captured by one or more sensors of the plurality of devices. Localization data can be sent to each device of the plurality of devices in response to receiving the plurality of localization requests. A plurality of pose data can be received from a first device and a second device of the plurality of devices. The plurality of pose data can include a position and orientation for each of the first and second devices based on the sensor data and the received localization data. At least one received pose data of the plurality of received pose data can be sent to at least the first device of the plurality of devices. The first device of the
(Continued)

plurality of devices can be operable to determine a relative location of the second device in relation to the first device based on the at least one received pose data of the second device.

20 Claims, 3 Drawing Sheets

Related U.S. Application Data continuation of application No. PCT/GB2018/050955, filed on Oct. 4, 2018.

(60) Provisional application No. 62/483,694, filed on Apr. 10, 2017.

(51) Int. Cl.
| | |
|---|---|
| *H04W 4/029* | (2018.01) |
| *G06T 19/00* | (2011.01) |
| *H04W 8/00* | (2009.01) |
| *G06V 20/10* | (2022.01) |

(52) U.S. Cl.
CPC .......... *H04W 4/029* (2018.02); *H04W 8/005* (2013.01); *G06T 2207/10028* (2013.01); *G06T 2207/30244* (2013.01)

(58) Field of Classification Search
CPC ............... G01S 5/0295; G06T 19/006; G06T 2207/10028; G06T 2207/30244; G06T 7/75; G06T 7/73; G06T 19/00; G06T 7/70; H04W 4/023; H04W 4/029; H04W 8/005; H04W 4/021; H04W 4/38; H04W 4/33; H04W 4/30; H04W 4/90; H04W 12/12; H04W 12/1201; H04W 8/00; H04W 12/1202; H04W 12/1204; H04W 12/00; H04W 12/00503; H04W 12/00516; H04W 4/02; H04W 4/025; H04W 4/026; H04W 4/027; G06K 9/00664; G06K 9/00; G06F 16/29; G06V 20/10

See application file for complete search history.

(56) References Cited

U.S. PATENT DOCUMENTS

| | | | |
|---|---|---|---|
| 9,432,929 | B1 | 8/2016 | Ross et al. |
| 9,476,970 | B1 | 10/2016 | Fairfield et al. |
| 9,485,623 | B2* | 11/2016 | Smith et al. ............ H04W 4/25 |
| 10,423,834 | B2 | 9/2019 | Badalamenti et al. |
| 10,798,526 | B2* | 10/2020 | Ondruska et al. .... H04W 4/023 |
| 2004/0199398 | A1 | 10/2004 | Kubota |
| 2005/0182518 | A1* | 8/2005 | Karlsson ...................... 700/253 |
| 2010/0023195 | A1 | 1/2010 | Traster |
| 2013/0038490 | A1* | 2/2013 | Garcia ......................... 342/451 |
| 2013/0102324 | A1* | 4/2013 | Qiu et al. ................... 455/456.1 |
| 2013/0215109 | A1 | 8/2013 | Miesnieks et al. |
| 2013/0215230 | A1 | 8/2013 | Miesnieks et al. |
| 2013/0218461 | A1 | 8/2013 | Naimark |
| 2014/0323148 | A1* | 10/2014 | Schmalstieg et al. .. H04W 4/04 |
| 2016/0179830 | A1 | 6/2016 | Schmalstieg et al. |
| 2016/0259032 | A1 | 9/2016 | Hehn et al. |
| 2016/0335275 | A1 | 11/2016 | Williams et al. |
| 2017/0163398 | A1 | 6/2017 | Ross et al. |
| 2017/0299691 | A1 | 10/2017 | Kumar et al. |
| 2018/0213359 | A1 | 7/2018 | Reinhardt et al. |
| 2019/0017839 | A1 | 1/2019 | Eyler et al. |

OTHER PUBLICATIONS

Canadian Patent Application No. 3,054,243, Search Report dated Oct. 13, 2021, 5 pages.

* cited by examiner

Figure 1 – Overview of the System

SYSTEMS AND METHODS FOR CO-LOCALIZATION OF MULTIPLE DEVICES

CROSS-REFERENCE TO RELATED APPLICATIONS

The present application is a continuation of U.S. application Ser. No. 16/598,973 filed on Oct. 10, 2019, which is a continuation of International Application No. PCT/GB2019/050955 filed Oct. 4, 2018 which claims benefit of U.S. Provisional Application No. 62/483,694 filed Oct. 4, 2017 and Great Britain Application No. 1705767.0 filed Oct. 4, 2017 and Great Britain Application No. 1804192.1 filed Mar. 5, 2018, which are hereby incorporated in entirety.

FIELD

The present invention relates to a method of co-localisation for multiple devices. More precisely, it relates to the use of both local and remote resources to provide substantially real time capability for individual devices to determine the relative position and/or pose of the or each individual device and other devices in three-dimensional space.

BACKGROUND

A robust capability for devices to determine the relative positions or poses of other devices within a three-dimensional space, for example with precision to within a centimetre, and with substantially real-time speed (for example at a rate of 30 times per second), is likely to be pivotal for many robotics, augmented, and virtual reality applications.

For example, a substantially centimetre-level of precision can enable multi-device augmented reality applications, where each device is aware of the corresponding three-dimensional positions of other devices. With this accuracy, applications can display augmented content at the relevant pixel locations, allowing for substantially seamless augmented reality user experiences. This capability can also allow multiple robots, such as self-driving cars for example, to be aware of each other's positions and to cooperate in traffic situations.

This level of precision cannot be achieved with current Global Navigation Satellite System (GNSS) technologies, especially in challenging environments. Typically this is because GNSS is hampered by the difficulties presented by environmental conditions experienced in at least some if not most locations (atmospheric effects, the reflection of signals off buildings in dense urban environments, sky visibility etc.). In particular, obtaining a satellite-referenced position within buildings and dense urban environments is typically very imprecise (i.e. there is a potential error of around 10 metres from the true device position).

Moreover, for localisation functionality with the above-mentioned level of precision to be useful in robotics and augmented reality applications, it must be sufficiently robust. For itto be sufficiently robust, it should work persistently, in all weather conditions, in changing environments, both indoors and outdoors, at large scale, and in substantially real-time.

Classical single-robot and multi-robot SLAM (simultaneous localisation and mapping) solutions are not sufficiently robust, and are typically not appropriate for both large scale use and with the degree of environmental change observed in the real world. These systems are therefore not designed to be used in challenging settings where large numbers of devices are communicating with one another through a limited-bandwidth channel. Most implementations do not scale appropriately, and are often designed for a predetermined set of environmental conditions and within a map of a predetermined size in order to avoid the requirement for a large amount of storage, processing power, or communication bandwidth.

SUMMARY OF INVENTION

Aspects and/or embodiments seek to provide a distributed localisation and/or mapping system capable of delivering substantially high-accuracy real-time localisation at one or more devices.

According to a first aspect, there is provided a method of determining a relative location of devices having one or more sensors comprising the steps of: receiving localisation requests from a plurality of devices, the localisation requests comprising at least a portion of data from the one or more sensors; sending localisation data to at least one of the plurality of devices in response to the localisation requests; receiving pose data from one or more of the plurality of devices; sending pose data to at least one of the plurality of devices; wherein one or more of the plurality of devices is operable to determine the relative location of at least one or more of the plurality of devices from the received localisation data and pose data.

According to a second aspect, there is provided a method of determining the location of a device having one or more sensors, relative to one or more other devices comprising the steps of: sending a localisation request to a server system, the localisation request comprising at least a portion of data from the one or more sensors; receiving localisation data from the server system in response to the localisation request; sending pose data to a server system; receiving pose data of at least one other device from the server system; determining a location of the device relative to the at least one other device from the received localisation data and pose data.

According to a third aspect, there is provided a system for determining the locations of devices relative to one another, the devices having one or more sensors, wherein the system comprises; a plurality of client devices including; at least one sensor producing sensor data; and a client localisation system; a server system including; a global map; and a pose manager containing pose data of at least one of the client devices; wherein the client localisation system is configured to; send and receive localisation information to and from the server system; wherein at least one client device is configured to; send and receive pose data to and from the pose manager; and, wherein at least one of the client devices is configured to; combine the client device pose data with the pose data of other client devices to determine their relative locations.

Where a device or client device provides both sensor data and pose data when making localisation requests to a server system, this can allow more accurate localisation data to be provided by the server system and/or can allow one or each of the (client) devices to determine the relative position and/or pose of one or more other (client) devices. The server system can use a global map (sometimes termed a map, a reference map, or a primary map) to determine the localisation of the (client) device(s) and send this in the localisation data to the (client) device(s).

Optionally, the step is performed of combining pose data and wherein the step of determining a location of a device includes determining the location of the device using the combined pose data.

Using combined pose data can allow for more accurate determination of the location of the device.

Optionally, the localisation request is sent to a server system.

By sending a localisation request to a server system, a client device can obtain a globally referenced location from the server system rather than relying on a potentially inaccurate locally determined localisation.

Optionally, the pose data of individual client devices is stored on a pose manager, and wherein the pose manager receives and propagates the pose data of the client devices to other client devices.

By storing pose data from multiple client devices in one location, some or all of the collected pose data can be sent to one or more of the client devices to enable the client devices to determine the relative position and/or pose of one of more of the other client devices.

Optionally, the further step of providing the relative position information of the client devices to an application is performed. Optionally, the application is an augmented reality engine. Optionally, the client devices have displays which display the augmented reality data.

By providing the relative position information to an application, the client devices can display relative position information to a user, forexample by showing relative position information in or on a map. The relative position information can be displayed by a client device using a variety of applications and/or mechanisms for example on a device display and/or any of a heads-up display (HUD) or augmented reality (AR) glasses etc.

Optionally, the localisation request further comprises an estimated location. Optionally, the method further comprises the step of estimating a location of the device based on data from the one or more sensors and wherein the step of determining a location of the device includes determining the location of the device using the estimated location.

The location of the device can be estimated using a variety of methods, including using local sensors such as satellite positioning to estimate the location of the device, before the location is determined for the device using, among other data, the estimated location.

Optionally the step of determining a location of the device further comprises using at least a portion of the data from the one or more sensors along with the received localisation data.

Using a portion of the data from the one or more sensors when determining a location of the device allows the location to be determined using sensor data. The at least a portion of the data can include visual odometry data and/or some or all of the raw data associated with any visual odometry.

Optionally, the step of determining a location of the device includes any of: determining the location of the device at the point in time that the localisation request was sent to the server system; or determining the current location of the device taking into account the point in time that the localisation request was sent to the server system.

Taking into account the point in time that the localisation request was sent to the server system can allow for the server system to compensate for movement of the device since the localisation request was sent to the server system and/or for the server system to determine the current location of the device taking into account the time difference since the localisation request was sent to the server system by the client device.

Optionally, the one or more sensors comprises at least one visual data sensor. Optionally, the at least one visual data sensor comprises any or a combination of: an image camera; a video camera; a monocular camera; a depth camera; a stereo image camera; a high dynamic range camera, a light detection and ranging sensor; a radio detection and ranging sensor. Optionally, the at least a portion of the data from the one or more sensors comprises visual data from the at least one visual data sensor.

Sensor data that includes visual data allows visual data to be sent to the server by a device along with any localisation requests, which can allow the server to determine the position and/or pose of the device using the visual data. A variety of visual data can be used to this end.

Optionally, the one or more sensors comprises an inertial measurement unit.

Sensor data that includes inertial measurement data allows this data to be sent to the server by a device along with any localisation requests, which can allow the server to determine the position and/or pose of the device using the inertial measurement data.

Optionally, the step of estimating a location further comprises using previous localisation data. Optionally, previous localisation data comprises any of: one or more previous estimates of location; one or more previous localisation requests; one or more of previous said localisation data received from the server system in response to previous said localisation requests; and previous determinations of location.

Using previous location estimates can allow the assessment of likely future and current location.

Optionally the step of estimating a location is performed using any of: a local pose; or a local frame of reference. Optionally, the localisation data received from the server system in response to said localisation request uses any of: a global pose; or a global frame of reference.

A local pose or a local frame of reference can be used to estimate a location based on cross-referencing this local pose or local frame of reference with data stored on the server from the one or more devices and/or a global pose and/or a global map and/or a global frame of reference.

Optionally, the method further comprises the step of determining a global to local pose transform or relationship; or a global frame of reference to local frame of reference transform or relationship.

Understanding the relationship or developing a transform between a global pose or frame of reference and/or a local pose or frame of reference of a device can allow the server to more accurately localise that device.

Optionally, the device comprises any of a mobile phone, a robot, augmented reality or virtual reality headset, or navigation device, a self-driving vehicle, a vehicle, a drone or other autonomous vehicle.

Devices can take many different forms and localisation of each of these forms of device can be accomplished using the aspects and/or embodiments. As an example, a mobile 'phone can be mounted in a standard road vehicle as a way of retrofitting augmented reality applications to any vehicle.

Optionally, the step of determining the location of the device is accurate to within several centimetres, optionally to within a centimetre.

With accuracy to within several centimetres, aspects and/or embodiments can provide suitably accurate localisation to enable better use of existing technology capability as well as new technology capabilities.

Optionally, the method is persistent.

Providing a persistent solution can allow for a solution that can be relied upon for critical systems, allowing better use of existing technology capability as well as new technology capabilities.

Optionally, determining the location of the device can be performed inside buildings or in dense urban areas.

Providing a method that can determine locations both inside and outside buildings and/or in dense urban areas can allow consistently accurate localisation across a wide variety of environments such as, for example: tunnels, parking garages or other environments with no access to reliable GNSS-based positioning.

Optionally, the sensor data comprises data on environmental conditions such as weather conditions.

Where the system for example is using visual odometry or other techniques, it can be of assistance to understand and have relevant reference data for different weather conditions in order to allow for localisation across weather conditions.

Optionally, the server system comprises global map data; optionally wherein the global map data comprises any of: one or more sets of local map data and/or one or more sets of global map data and/or one or more global maps of interconnected local maps.

By providing a global map, the global map can be used as a reference data source from which localisation can be determined for devices sending localisation requests or for determining the location of devices.

Optionally, the server system can be any of: a single server, a distributed server system, a cloud system, a physical system or a virtual system. Optionally, the global map can be distributed between a plurality of server systems. Optionally, the global map can be hosted in a peer-to-peer arrangement on any of: one or more devices acting as a server system, or a mix of one or more server systems and one or more devices. Optionally, the device and server system communicate overany of: a mobile data network, orwireless data network.

A variety of hardware and/or software configurations and/or implementations can be used to provide flexibility and/or scaling of the system.

Optionally, the device has a odometry system. Optionally, the odometry system processes sensor data to determine relative position differences between successive sensor data.

Optionally, the position estimates have between three and six degrees of freedom. Optionally, the odometry system performs full simultaneous location and mapping and/or loop closure and/or graph optimisation. Optionally, the odometry system outputs the estimated position.

Providing an odometry system can allow a more accurate estimate of position to be determined by a device and/or can allow for richer sensor data and/or metadata to be gathered for submission to a server along with a localisation request.

Optionally, the localisation data is sent to two or more of the plurality of devices in response to the localisation requests. Optionally, the pose data is received from two or more of the plurality of devices.

Providing localisation data to and/or receiving pose data from two or more devices can allow for relative pose and/or localisation to be determined.

Optionally, the estimated position is relative to a local origin. Optionally, the previous localisation data is stored with a timestamp. Optionally, the location of the device is determined in a global co-ordinate frame. Optionally, the localisation request is in a local co-ordinate frame. Optionally, the method further comprises the step of determining a transform between the global co-ordinate frame and the local co-ordinate frame. Optionally, the localisation data is in a global co-ordinate frame.

Optionally, the pose data further comprises velocity data.

In addition to transmitting estimated poses of the devices to and from the server, pose data can include velocity estimates. This can allow the prediction of the position of the device in short time horizons and mitigate the time lag of the device position caused by the latency to the server. (i.e. to show device's current position instead of the position at the time the data was collected or the localisation request transmitted). Such an information can be estimated by differentiating pose data or obtained directly from the embodied accelerometer sensor.

Optionally, the pose data further comprises an estimate of uncertainty.

In addition to transmitting pose data, or estimated poses of the devices, to and from the server, an estimate of the uncertainty of the estimated pose can be transmitted to the server along with the pose data, This process can be augmented to support estimation of the accuracy of the computed poses by modifying in terms of transmitted data and associated processing.

Optionally, one or more of the plurality of client devices provides together provide at least a portion of the functionality of the server system and/or the client devices are in communication in a peer-to-peer arrangement.

The devices capable of sharing the same low-latency network connection such as Bluetooth or connected to the same Wi-Fi network can have their own versions of server modules and exchange information about their poses and optionally pieces of the map directly in addition or bypassing the communication with the server. This is likely to increase the performance of the system, decrease the communication lag and robustify it against the central server unreachability or failure.

Optionally, sensor data is used to create or update the global map. Optionally, creating or updating the global map comprises any of: creating a new node in the global map; updating or amending an existing node in the global map; deleting a node in the global map; optimising the global map; or performing global loop-closures to link positions of different localisation nodes.

Updating the global map or global master map using sensor data allows the global map to adapt over time and continuously improve through AR uses. This includes the global map growing larger in size and richer in data for, for example, different environmental conditions.

BRIEF DESCRIPTION OF DRAWINGS

Embodiments will now be described, by way of example only and with reference to the accompanying drawings having like-reference numerals, in which.

SPECIFIC DESCRIPTION

An example embodiment will now be described with reference to FIG. 1.

Figure 1:
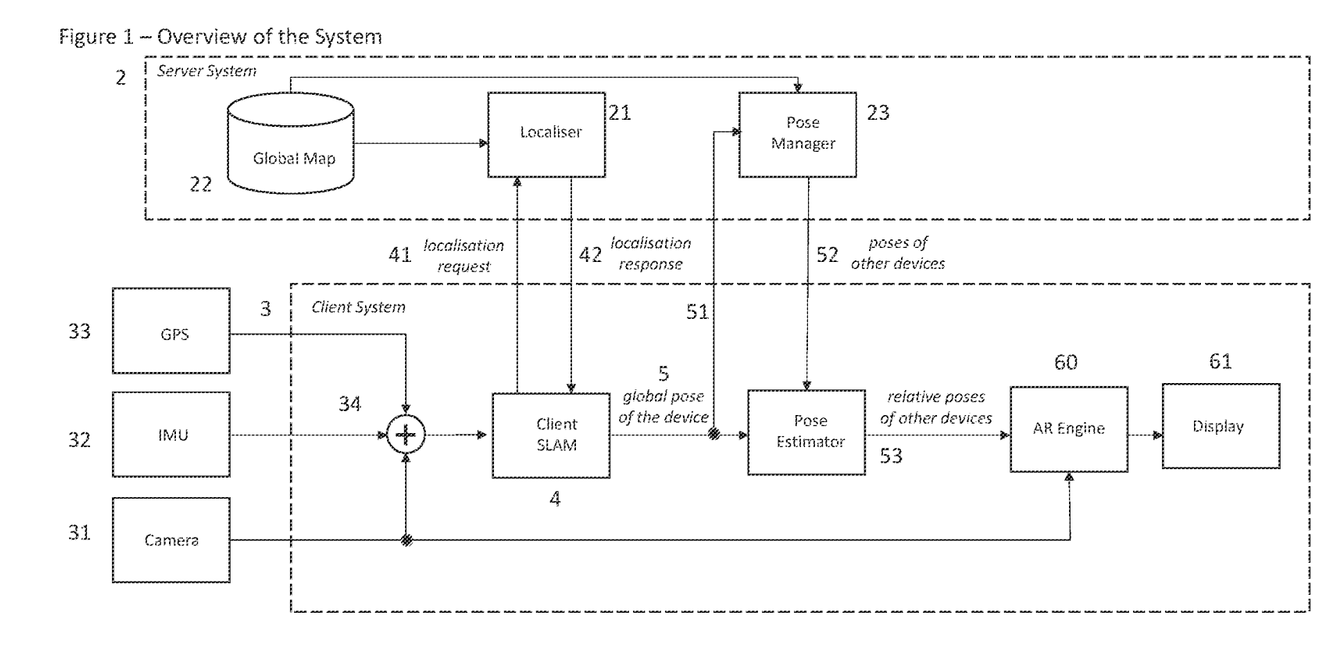
FIG. 1 illustrates an overview of the system according to an embodiment.

In the embodiment of FIG. 1, the system 1 comprises one server system 2 communicating with at least one client device 3.

A client device 3 according to this embodiment will now be described in more detail. (In use, a plurality of client devices 3 will typically be deployed.)

In this embodiment, a client device 3 is configured to run on client hardware 3 equipped with at least one sensor 31. For example, the client hardware 3 may be a device such as a mobile 'phone, an augmented reality headset, a robot, a drone, or an autonomous car driving system. Typically, at least one, and in many cases, a plurality of client devices 3 would be deployed.

The sensor(s) 31 can, for example, include a camera 31 (which can be an image sensor, depth camera, Light Detection and Ranging ('LIDAR'), or video sensor), an inertial measurement unit ('IMU') 32, and/or a satellite positioning system (such as Global Navigation Satellite System ('GNSS')) 33. Data from the sensor(s) 31 can be combined or blended by a combiner 34. It is to be appreciated that any suitable sensor technology may be used as one or more of the sensor 31 types listed above.

The role of the or each client device 3 is to process client device sensor data acquired from the sensor(s) 31, communicate with the server system 2 to maintain a real-time global position estimate of the or each client device 3, provide individual pose data to the server system 2, receive pose data of other client devices 3, and combine the individual pose data with the pose data of other client devices 3 to determine the relative position of the other client devices 3.

In addition, the or each client device 3 is configured to maintain high-frequency communication with a server pose manager 23 in order to propagate its own pose information and receive the positions of other client devices 3. Combining a client device's 3 own pose with the poses of other client devices 3 results in accurate real-time estimate of poses of client devices 3 to be used in AR or robotics applications.

The or each client device 3 contains a client localisation system 4 which takes data from sensor(s) 31, and processes data from the sensor(s) 31. The client localisation system 4 communicates with the server system 2 to maintain accurate global pose 5.

Further, the or each client device 3 of this embodiment is configured to process sensor data, and the or each client device 3 includes a client localisation system 4. The client localisation system 4 may take the form of a local Visual Odometry ('VO') system or may be a Simultaneous Localisation and Mapping ('SLAM') system. The client localisation system 4 is configured to process the sensor data from the sensor(s) 31 of the client device 3 to determine its movement and position in a local map of the environment. Additionally, the client localisation system 4 generates localisation requests, computes and reports device positions, receives one of more absolute poses for other devices, and computes the pixel coordinatesfortheotherdevices.

The sensor data is used to determine the movement and position of the client device 3 in the local map of the environment. Given the local map and sensor 31 data, the client localisation system 4 can determine the position of the client device 3. This can be achieved using standard localisation methods, such as triangulation or shape matching at a relatively high rate, and whenever such readings are available (and typically at 30Hz). Communication with the server system in a form of map downloading or synchronisation typically occurs at much slower rate (for example at a rate of once per second or once per several seconds).

The local map may be constructed using the sensors, or, by directly downloading a portion of a global map from the server system 2 (explained in more detail later). If the map is created from the sensor data, an additional synchronisation step of local and global map will be required to determine the position of the local map with respect to the global map.

Based on the sensor(s) 31 used, the determination can be implemented in several ways. For example, in the case of a camera sensor, the camera movement can be determined by matching and triangulating observed image features or pixel intensities in between successive measurements to carry out VO. Mesh-matching methods such as iterative closest point optimisation can be used to achieve similar pose estimates in the active sensor(s) 31 such as depth cameras or LIDAR sensors. Furthermore, several such measurements coming from different sensors 31 and modalities can be integrated into one pose estimate using methods such as Kalman Filtering to compensate for individual sensor 31 drawbacks and to achieve higher robustness and accuracy.

From the sensor 31 data and/or relative position differences, measurements are then accumulated to provide relative real-time position estimates. In the most general case the position estimates take the form of a pose with six degrees-of-freedom (three-dimensional rotation and three-dimensional translation), and additional information such as velocity, and/or acceleration. In the case of embodiments relating to, for example, planar automotive scenarios this can be reasonably reduced to three degrees of freedom (rotation and two-dimensional translation), along with velocity, and/or acceleration. In some embodiments, only one degree of freedom can be used.

The client device 3 also includes a global pose record, which is in communication with the server system and receives localisation responses from the server system. The global pose record is in communication with the global pose estimator. The global pose estimator is also in communication with the local pose record and the odometry system. The global pose estimator outputs the estimated global position of the client device 3. The odometry system and the local pose record are in communication with the sensor(s) 31. The global pose estimator outputs the estimated global position of the client device 3 and this can be combined with the combined sensor data to be sent as a localisation request to the server system 2.

The role of the server system 2 in this embodiment is to maintain and update a consistent global master map 22, and to respond to global localisation requests 41 from client devices 3 using the global master map 22 data stored on the server system 3. In this embodiment, where the communications are typically made over a bandwidth-restricted communication channel, it is anticipated that the global localisation requests 41 from each client device occur with low frequency in order to minimise bandwidth usage and/or utilise the bandwidth available in an efficient manner. A localisation response 42 is sent by the server system 2 to the client device 3 that sent the localisation request 41.

Returning to a more general discussion of the client device 3, when carrying out odometry, errors may be introduced. This is because odometry typically accumulates an error over time if based purely on local sensor data and estimates. The effect of this error is known as "drift". In order to mitigate this effect, the client device 3 may implement a SLAM system as discussed above. This system uses loop closure and graph optimisation procedures and results in a much more accurate position output.

Implementations of such systems will depend on the type of sensor(s) 31 used, such as, for example a monocular or stereo camera, a depth camera, or one or more laser sensors.

The server system 2 of this embodiment will now be described in more detail below.

The server system 2 contains the global map 22, which maintains a localisation map of the environment, the localiser 21, which accepts and responds 42 to localisation requests 41, and the pose manager 23, which synchronises and propagates the pose information 5 of individual client devices 3.

In this embodiment, the server system 2 is running on and implemented using cloud infrastructure, but in other embodiments the server system 2 may have a variety of physical and/or virtual configurations. In other embodiments, for example, there may be one or more servers and/or server systems and, where there are more than one servers and/or server systems, these may be configured to act as a single server or server system or as multiple independent servers or server systems and may or may not be in direct communication with each other.

A global map 22 is maintained at the server system 2, the global map 22 having or using a global frame, i.e. coordinates providing a global frame of reference. Each client device 3 can have its own local frame, i.e. local frame of reference. In some embodiments, however, the global master map may comprise multiple local and/or global maps, each with their own respective local and/or global reference frame.

Optionally, the devices capable of sharing the same low-latency network connection such as Bluetooth or connected to the same Wi-Fi network can have their own versions of server modules and exchange information about their poses and optionally pieces of the map directly, for example in a peer-to-peer arrangement, in addition or bypassing the communication with the server. This is likely to increase the performance of the system, decrease the communication lag and robustify it against the central server unreachability or failure.

The client device 3 and/or server system 2 may not be able to relate the local reference frames of multiple client devices 3 to each other so these may need to exist as separate local and/or global maps within the global master map. For example, where a client device 3 is operating indoors, for example in a factory, and has no need to leave the factory then it will not usually be possible, for example with GNSS coordinates, to relate this to outdoor local maps or other local and/or global map(s) relevant to other client devices 3.

In this embodiment, the global map 22 is a map composed of data necessary to perform a global localisation of a device given its sensor data. For example, in the case of visual localisation system the map can be comprised of the 30 positions of visual features in the space, such as image corners, scale-invariant feature transform ('SIFT'), AKAZE local features matching, or Binary Robust Invariant Scalable Keypoints ('BRISK') analysis which can be used to triangulate the position of the camera when taking an image using established methods. In the case of LIDAR or depth-camera-based sensors, this map can contain 30 point clouds to perform shape-matching-based localisation or the combination of visual and shape-based method. Such a map can be constructed by pre-surveying an environment using different sensors or can be constructed in a distributed manner.

The server system 2 contains a localiser 21 which responds to localisation requests from client devices 3. The localiser 21 at the server system 2 responds 42 to the localisation request 41 from the or each client device 3 with an estimate of the "global position" of the or each client device 3 at a time of the issued localisation request 41, sent by the server system 2 as a localisation response 42.

The localisation requests 41 from the or each client device 3 contains a portion of the sensor data from one or more sensors 31 necessary to perform global localisation using the global map. The localisation request 41 can also contain additional data necessary for localisation, such as its estimated position or the results of previous localisation requests or portions of the local map constructed by a local SLAM system.

The localisation request 41 is sent to a localiser or (sub-)process 21 at the server system 2. Simultaneously the current estimate of the device position in the local coordinate frame produced by the odometry is added to the client local pose record database. The localiser 21 at the server system 2 responds to the localisation request 41 from the or each client device 3 with an estimate of the global pose of the or each client device 3 at a time of the issued localisation request 41, sent by the server system 2 as a localisation response 42. This localisation response 42, when received by the or each client device 3 is then stored in the global pose record of the or each client device 3. Provided that at least one localisation request 41 was successfully responded to, the relative and global pose of these requests are retrieved from local and global pose records and compared to provide the estimate of the local origin pose in the global map of the client device 3. This estimate is then combined with subsequent high-frequency device pose/location estimates in the local coordinate frame from the odometry system to provide a high-frequency device pose, or location, in the global coordinate frame.

In some embodiments, the information stored in the local and/or global pose records is a list of local and/or global positions of the device. Each position is associated with a particular time and unique timestamp or ID. In some embodiments, as an alternative or addition, each position can be associated with GPS data which can include timestamp data. The aforementioned time might be that of a particular sensor measurement, and the timestamp or ID can be used to cross-reference the local and global record. Relating the local and global pose of one or multiple device poses together with the current local device pose gives the current global device pose. In other embodiments, additional or alternative information can be stored in the local or global pose records.

The localiser 21 uses the data from localisation request to perform 6-degree-of-freedom localisation of the device at the time of issuing the request and propagates this information back to the client device. In addition to the 6-degree-of-freedom pose, the localisation response can contain additional information necessary to perform or improve performance of the client local SLAM system, for example a portion of the global map around the device position. Due to the amount of data required, this communication occurs infrequently, typically once per second or every several seconds.

The server pose manager receives the global position of individual client devices whenever such information becomes available from a client visual system (typically at the frequency of client sensor readings, or 30 Hz) and propagates this information back to all the relevant client devices. This way, all the devices are aware of the positions of other devices at real-time speed necessary for interactive AR and robotics applications.

The system of some, or all, of these embodiments can be used in distributed large-scale scenarios with low-cost client hardware, such as mobile phones, and/or with any, or all, of: augmented reality headsets, self-driving cars, drones, and other robots.

The server system 2 and client device 3 are in communication with each other, typically through a bandwidth-restricted communication channel, and in this embodiment for example the communications channel 4 is a mobile 'phone cellular data network. This restriction does not, for example, allow for real-time high-fidelity streaming of the sensor data to the server and using some of the established SLAM systems. It is therefore necessary that this communication protocol is as efficient as possible. In other embodiments, other wireless data networks may be used instead or in addition to a mobile 'phone cellular data network.

In order to ensure the accuracy of the relative poses between two devices, in general terms, four elements are at play, which are:

The accuracy of the SLAM system on the or each client device 3;

The accuracy of localising a first client device 3 against the global map;

The accuracy of localising a second client device 3 against the global map; and The accuracy of the global map data between the locations of the first client device 3 and the second client device 3.

The accuracy of the SLAM on the or each client device 3 is the amount of "drift" (discussed above which is accumulated over time since the last localisation. The techniques and apparatuses described herein seek to mitigate (or alleviate) the phenomenon of "drift".

The accuracy of the localisation of the first and second client devices 3 against the global map may be derived from the performance of the localizer and quality of the global map at any particular location. The accuracy of the global map data between the locations of the first and second client devices 3 is in dependence upon on the quality of the underlying map. Client devices 3 localised against the same portion of the global map will have a low level of relative uncertainty between their locations, whereas devices which are localised against different portions of the global map will have a higher level of relative uncertainty. The relative accuracy of (and between) different portions of the global map may be computed using various techniques, with one such technique calculating the shortest path in associated pose graph of the underlying map.

Accounting for all four of the elements set out above requires the cooperation of the SLAM system on the or each client device 3, the pose estimator, the localiser, and the pose manager in FIG. 1 to carry out a correspondent piece of computation and appropriate augmentation of the transmitted data to support this computation. This includes passing information about the relative accuracy of the pose estimation from the localiser and the SLAM system on the or each client device 3 in a particular form (for example as a Covariance Matrix), estimating the accuracy of the global map between all (or subset of) pairs of localised client devices 3 in the pose manager and combining all this information together in the pose estimator.

The output of the client localisation system 4 can provide a substantially high-quality estimate (or estimates) of device position in relation to some arbitrary local origin (the arbitrary local origin is typically the position of the device where the system started or initiated).

To achieve global localisation (i.e. a substantially high-accuracy position in a global map), a relative position to the local origin in the global coordinate map must be estimated.

To achieve this, the client device 3 regularly performs global "localisation requests" 41 to the server system 2. A summary of recent sensor inputs in a form of, for example, image or video data, depth maps, features, relationship to previous localisation requests etc. is aggregated to create a localisation request 41. Sometimes, for a particular frame, data will only be available from one, typically high frequency sensor, such as an IMU and so only this data is transmitted in the localisation request 41. For a typical frame, data may be available from a plurality of sensors, for example an image from a visual sensor along with IMU data, which can be transmitted in the localisation request 41. As the bandwidth between the client device 2 and server system 3 is limited, this localisation request 41 is usually of a much smaller data size and performed at much lower frequency than the related equivalent raw sensor data but given sufficient bandwidth the raw sensor data can optionally be streamed directly to the server system as a continuous localisation request (and similarly the localisation response from the server can then be intermittent or continuous).

This localisation request 41 is sent to a localiser module or (sub-)process 21 at the server system 2. The localiser 21 at the server system 2 responds to the localisation request 41 from the client device 3 with an estimate of the "global position" of the device 3 at a time of the issued localisation request 41, sent by the server system 2 as a localisation response 42.

This estimate is then combined with subsequent high-frequency device pose/location estimates in the local coordinate frame from the client localisation system 4 to provide a high-frequency device pose, or location, in the global coordinate frame i.e. the global position of the device 5.

In this embodiment, the pose data transfer to and from the server is handled for the client device by the client pose manager.

In order to maintain real-time rates of interaction with other client devices 3, their relative positions with respect to other client devices 3 must be known. This is achieved through reporting the device position to the server pose manager 23 whenever a new global position of the device 5 is available.

The server pose manager 23 gathers the global pose data 5 of individual client devices 3 and redistributes this data to all of the client devices 3 involved in the system. All of the client devices 3 therefore have access to the latest (and most current) global positions 5 of each of the other client devices 3 and may therefore determine their relative positions. Moreover, as the global position information 5 is usually very small (for a 6-degree-of-freedom pose) it can be communicated with the server at very high-frequency, ensuring that the up-to-date global position 5 of each client device 3 is available to every client device 3.

Figure 2:
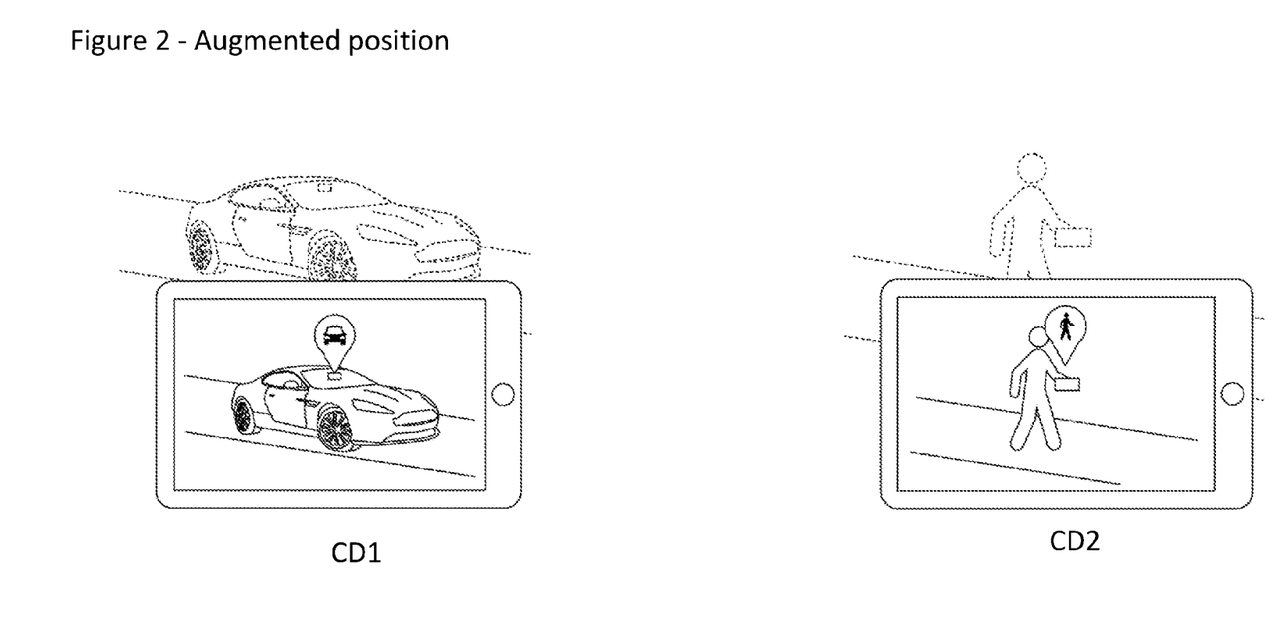
FIG. 2 illustrates a multiple client devices according to an embodiment.

Given the up-to-date nature of the global position 5 of each client device 3, the relative positions of the client devices 3 can be used in applications. In an example, the global position 5 of a particular client device 3, along with the global positions 5 of other client devices 3 (which become the relative positions of other client devices 3) to an AR engine 60, to enable the AR engine 60 be used to project information regarding the relative positions of the other client devices 3 onto a display 61. This may use projective geometry, or may draw or otherwise render an augmented object or a label against an appropriate person or object. In the context of an AR application, this is illustrated in FIG. 2.

Figure 3:
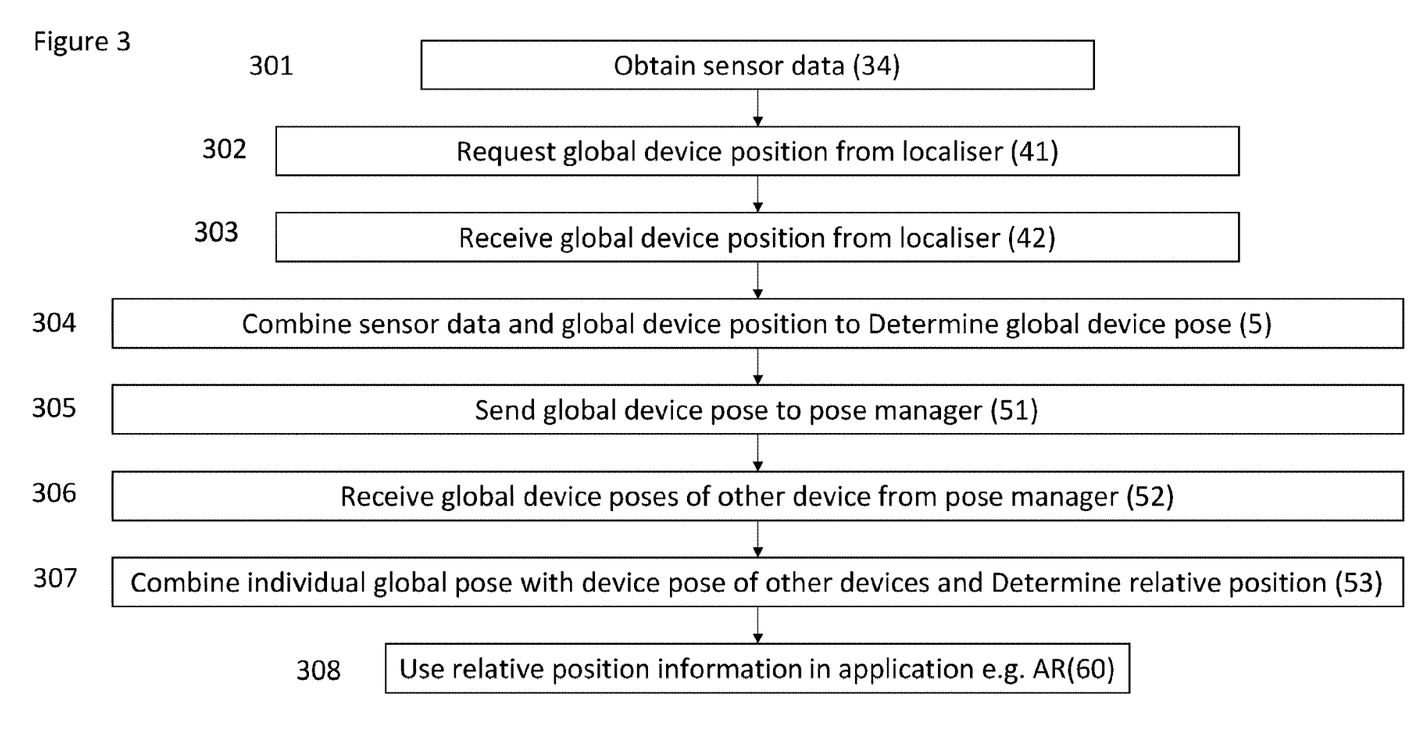
FIG. 3 illustrates a flowchart showing the system operation according to an embodiment.

The operation of the system 1 is set out in the flowchart of FIG. 3, which will now be described in further detail.

In step 301, the client device 3 obtains sensor data 34 from the on-board sensors 31, 32, 33 for example image or video data from a camera. In step 302, the client device 3 requests its global device position from the localiser 21. In step 303, the client device 3 receives its global device position from the localiser 21. In step 304, the client device 3 combines the sensor data 34 and the localisation response 42 to determine its global device pose 5. In step 305, the client device 3 sends its global device pose 5 to the pose manager 23. In step 306, the client device 3 receives the global device poses of another device 52 from pose manager 23. In step 307, the client device combines its individual global pose 5 with the device pose of any other devices 52 and determines their relative position 53. In step 308, the client device 3 use relative position information 53 in an application 60.

In some embodiments, some or all of the client devices do not estimate their position and/or do not transmit an estimated position along with sensor data in localisation requests to the server. Typically, this would be the case for devices that have either a temporarily disabled or malfunctioning odometry system, or limited functionality or hardware, or are producing varyingly inaccurate estimates of position.

The term "global map" throughout the specification can respectively be replaced with "map", "reference map", "base map" or "primary map". The term "global map" is intended to define a master or primary map data used for reference purposes, typically stored at a server. The map referred to throughout the specification as a "local map" is a map typically stored and/or generated on a device (such as a mobile device) and this term may be replaced with "city map", "partial map" or "a portion and/or subset of the global map."

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A computer-implemented method comprising:
providing, by a computing system, a localization request, the localization request comprising sensor data captured by one or more sensors of the computing system;
receiving, by the computing system, localization data responsive to the localization request;
sending, by the computing system, first pose data associated with the computing system, wherein the first pose data includes a position and orientation of the computing system based on the sensor data and the received localization data;
receiving, by the computing system, second pose data associated with a second computing system; and
determining, by the computing system, a relative location of the second computing system in relation to the computing system based on the received localization data and the received second pose data;
updating, by the computing system, a global pose of the computing system based on the received second pose data associated with the second computing system; and
storing, by the computing system, the updated global pose of the computing system in a record.

2. The method of claim 1, further comprising:
combining, by the computing system, the sensor data and the received localization data to determine the global pose of the computing system.

3. The method of claim 2, wherein the determining the relative location of the second computing system comprises:
combining, by the computing system, the second pose data associated with the second computing system and the global pose of the computing system.

4. The method of claim 1, wherein the first pose data has a first data size and the localization request has a second data size less than the first data size.

5. The method of claim 1, wherein the first pose data comprises an N-degree-of-freedom pose and the first pose data is provided to a server at a frequency greater than a frequency that the localization request is provided to the server.

6. The method of claim 1, wherein the one or more sensors comprises an inertial measurement unit (IMU) associated with the computing system, wherein the sensor data comprises sensor data captured by the IMU, and wherein the received localization data is determined based on the sensor data captured by the IMU.

7. The method of claim 1, wherein the one or more sensors comprises at least one visual data sensor, wherein the at least one visual data sensor comprises one or more of: an image camera, a video camera, a monocular camera, a depth camera, a stereo image camera, a high dynamic range camera, a light detection and ranging sensor, or a radio detection and ranging sensor.

8. The method of claim 1, further comprising:
providing, by the computing system, the relative location to an augmented reality engine.

9. The method of claim 8, further comprising:
presenting, by the computing system, the relative location on at least one of: a device display, a heads-up display (HUD), or an augmented reality display.

10. The method of claim 9, further comprising:
projecting, by the computing system, information associated with the relative location of the second computing system onto a display screen associated with the computing system; or
rendering, by the computing system, an augmented reality object at the relative location.

11. A computing system comprising:
at least one processor; and
at least one memory storing instructions that, when executed by the at least one processor, cause the computing system to perform:
sending a localization request, the localization request comprising sensor data captured by one or more sensors of the computing system;
receiving localization data responsive to the localization request;
sending first pose data associated with the computing system, wherein the first pose data includes a position and orientation of the computing system based on the sensor data and the received localization data;
receiving second pose data associated with a second computing system;

determining a relative location of the second computing system in relation to the computing system based on the received localization data and the received second pose data;

updating a global pose of the computing system based on the received second pose data associated with the second computing system; and storing the updated global pose of the computing system in a record.

12. The computing system of claim 11, wherein the instructions cause the computing system to further perform:

combining the sensor data and the received localization data to determine the global pose of the computing system.

13. The computing system of claim 12, wherein the determining the relative location of the second computing system comprises:

combining the second pose data associated with the second computing system and the global pose of the computing system.

14. The computing system of claim 11, wherein the first pose data has a first data size and the localization request has a second data size less than the first data size.

15. The computing system of claim 11, wherein the first pose data comprises an N-degree-of-freedom pose and the first pose data is provided to a server at a frequency greater than a frequency that the localization request is provided to the server.

16. A non-transitory computer-readable medium comprising computer-executable instructions which, when executed by at least one processor of a computing system, cause the computing system to perform:

sending a localization request, the localization request comprising sensor data captured by one or more sensors of the computing system;

receiving localization data responsive to the localization request;

sending first pose data associated with the computing system, wherein the first pose data includes a position and orientation of the computing system based on the sensor data and the received localization data;

receiving second pose data associated with a second computing system; and determining a relative location of the second computing system in relation to the computing system based on the received localization data and the received second pose data;

updating a global pose of the computing system based on the received second pose data associated with the second computing system; and storing the updated global pose of the computing system in a record.

17. The non-transitory computer-readable medium of claim 16, wherein the at least one processor further causes the computing system to perform:

combining the sensor data and the received localization data to determine the global pose of the computing system.

18. The non-transitory computer-readable medium of claim 17, wherein the determining the relative location of the second computing system comprises:

combining the second pose data associated with the second computing system and the global pose of the computing system.

19. The non-transitory computer-readable medium of claim 16, wherein the first pose data has a first data size and the localization request has a second data size less than the first data size.

20. The non-transitory computer-readable medium of claim 16, wherein the first pose data comprises an N-degree-of-freedom pose and the first pose data is provided to a server at a frequency greater than a frequency that the localization request is provided to the server.

* * * * *